United States Patent
Ricciardo et al.

(10) Patent No.: US 11,181,077 B2
(45) Date of Patent: Nov. 23, 2021

(54) COPPER COMBUSTION CHAMBER ATTACHED TO INJECTOR BY NON-COPPER WELD TRANSITION RING

(71) Applicant: Aerojet Rocketdyne, Inc., Sacramento, CA (US)

(72) Inventors: Mark J. Ricciardo, Jupiter, FL (US); Edmund B. Stastny, Sacramento, CA (US); Lee A. Ryberg, Jupiter, FL (US)

(73) Assignee: AEROJET ROCKETDYNE, Inc., Jupiter, FL (US)

( * ) Notice: Subject to any disclaimer, the term of this patent is extended or adjusted under 35 U.S.C. 154(b) by 87 days.

(21) Appl. No.: 16/765,293

(22) PCT Filed: Oct. 9, 2018

(86) PCT No.: PCT/US2018/054920
§ 371 (c)(1),
(2) Date: May 19, 2020

(87) PCT Pub. No.: WO2019/108306
PCT Pub. Date: Jun. 6, 2019

(65) Prior Publication Data
US 2020/0318576 A1 Oct. 8, 2020

Related U.S. Application Data

(60) Provisional application No. 62/593,910, filed on Dec. 2, 2017.

(51) Int. Cl.
*F02K 9/60* (2006.01)
*F02K 9/62* (2006.01)
*F02K 9/52* (2006.01)

(52) U.S. Cl.
CPC .................. *F02K 9/62* (2013.01); *F02K 9/52* (2013.01); *F05D 2230/20* (2013.01);
(Continued)

(58) Field of Classification Search
CPC ..... F02K 9/62; F02K 9/52; F02K 9/32; F02K 9/34; F05D 2230/20; F05D 2230/233;
(Continued)

(56) References Cited

U.S. PATENT DOCUMENTS 6,138,451 A 10/2000 Kreiner et al.
6,397,580 B1 * 6/2002 Stechman, Jr. ........... F02K 9/52
60/204

(Continued)

OTHER PUBLICATIONS

International Preliminary Report on Patentability for International Patent Application No. PCT/US2018/054920 dated Jun. 2, 2020.
(Continued)

*Primary Examiner* — Jun S Yoo

(57) ABSTRACT

A rocket engine includes a copper alloy combustion chamber, a non-copper weld transition ring welded to the copper alloy combustion chamber, and an injector assembly welded to the non-copper weld transition ring. The engine can be manufactured by forming the copper alloy combustion chamber using additive manufacturing, welding the non-copper weld transition ring to the copper alloy combustion chamber, and welding the injector assembly to the non-copper weld transition ring.

16 Claims, 3 Drawing Sheets

(52) U.S. Cl.
CPC .... *F05D 2230/233* (2013.01); *F05D 2230/31* (2013.01); *F05D 2230/60* (2013.01); *F05D 2230/80* (2013.01); *F05D 2300/171* (2013.01); *F05D 2300/172* (2013.01); *F05D 2300/175* (2013.01)

(58) Field of Classification Search
CPC ............ F05D 2230/31; F05D 2230/60; F05D 2230/80; F05D 2300/171; F05D 2300/172; F05D 2300/175; B22F 7/062; B22F 5/009; B33Y 80/00; B33Y 10/00; B23K 26/282
See application file for complete search history.

(56) References Cited

U.S. PATENT DOCUMENTS

| | | | |
|---|---|---|---|
| 6,698,184 B1 | 3/2004 | Sowa | |
| 6,705,076 B1 | 3/2004 | Sowa | |
| 10,527,003 B1 * | 1/2020 | Beck | F02K 9/972 |
| 2017/0107945 A1 * | 4/2017 | Tertre | F02K 9/52 |
| 2019/0309706 A1 * | 10/2019 | Guichard | F02K 9/64 |

OTHER PUBLICATIONS

International Search Report and Written Opinion for International Patent Application No. PCT/US2018/054920 completed Jan. 10, 2019.

* cited by examiner

COPPER COMBUSTION CHAMBER ATTACHED TO INJECTOR BY NON-COPPER WELD TRANSITION RING

CROSS-REFERENCE TO RELATED APPLICATION

The present disclosure claims priority to U.S. Provisional Patent Application No. 62/593,910, filed Dec. 2, 2017.

BACKGROUND

Liquid propellant rocket engines may be powered by a fuel propellant and an oxidizer propellant. The fuel and oxidizer are typically provided to an injector, which introduces the propellants into a combustion chamber for combustion. The combustion products are then exhausted through a nozzle downstream of the combustion chamber.

SUMMARY

A process of manufacturing a rocket engine according to an example of the present disclosure includes the process of providing a copper alloy combustion chamber using additive manufacturing, welding a non-copper weld transition ring to the copper alloy combustion chamber, and welding an injector assembly to the non-copper weld transition ring.

In a further embodiment of any of the foregoing embodiments, the welding of the non-copper weld transition ring to the copper alloy combustion chamber is performed by electron beam welding.

In a further embodiment of any of the foregoing embodiments, the welding of the injector assembly to the non-copper weld transition ring includes using a weld bead.

A further embodiment of any of the foregoing embodiments includes removing the injector assembly from the non-copper weld transition ring, followed by re-welding the injector assembly or a new injector assembly to the non-copper weld transition ring.

In a further embodiment of any of the foregoing embodiments, the composition of the copper alloy combustion chamber is unchanged through the removing and the re-welding.

In a further embodiment of any of the foregoing embodiments, the welding of the non-copper weld transition ring to the copper alloy combustion chamber includes welding the ring adjacent to a backstop on the copper alloy combustion chamber, followed by removing the backstop from the copper alloy combustion chamber.

In a further embodiment of any of the foregoing embodiments, the providing of the copper alloy combustion chamber includes forming the copper alloy combustion chamber by selective laser melting.

A rocket engine according to an example of the present disclosure includes a copper alloy combustion chamber, a non-copper weld transition ring welded to the copper alloy combustion chamber, and an injector assembly welded to the non-copper weld transition ring.

A further embodiment of any of the foregoing embodiments includes a converging-diverging nozzle attached to the copper alloy combustion chamber.

In a further embodiment of any of the foregoing embodiments, the non-copper weld transition ring is formed of stainless steel or a nickel-based alloy.

In a further embodiment of any of the foregoing embodiments, the injector assembly is formed of stainless steel or a nickel-based alloy.

In a further embodiment of any of the foregoing embodiments, the non-copper weld transition ring and the injector assembly are formed of stainless steel or a nickel-based alloy.

In a further embodiment of any of the foregoing embodiments, the non-copper weld transition ring and the injector assembly are joined together by a weld bead.

In a further embodiment of any of the foregoing embodiments, the non-copper weld transition ring and the copper alloy combustion chamber are joined by an electron beam weld joint.

In a further embodiment of any of the foregoing embodiments, the non-copper weld transition ring defines a first cavity wall portion and the injector assembly defines a second cavity wall portion, and the first cavity wall portion and the second cavity wall portion together define a cavity, and there being a weld bead disposed in the cavity.

In a further embodiment of any of the foregoing embodiments, the non-copper weld transition ring includes a frustoconical inner diameter surface that bears against the injector assembly.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
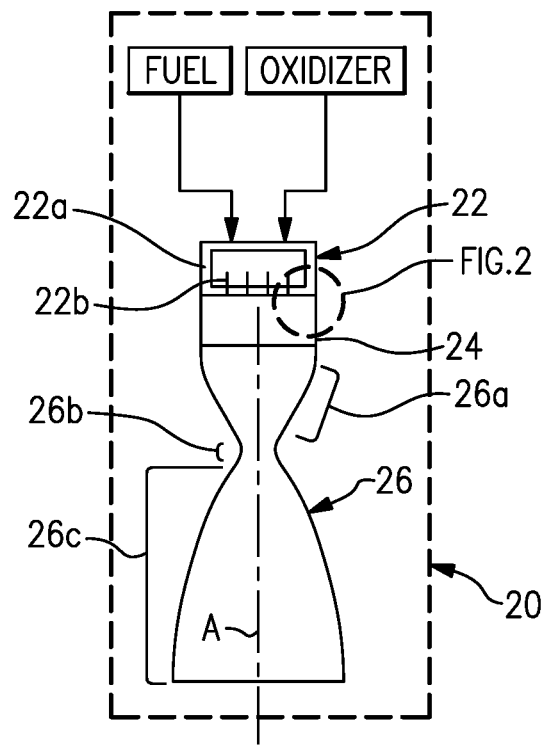
FIG. 1 illustrates an example rocket engine.

FIG. 1 schematically illustrates a liquid propellant rocket engine 20. As will be appreciated, there are many different types of liquid propellant engines to which this disclosure may apply. In this regard, although not shown, the engine 20 will typically have plumbing for delivering propellants, as well as pumps and valves for controlling propellant delivery.

In this example, the engine 20 is operable to pump fuel (e.g., liquid hydrogen or hydrocarbon) and oxidizer (e.g., liquid oxygen) to an injector assembly 22. The injector assembly 22 may generally include an injector housing 22a and one or more injector elements 22b that are operable to introduce the fuel and oxidizer into a downstream copper alloy combustion chamber 24. The combustion products are then exhausted through a nozzle 26. In the example shown, the nozzle 26 is a converging-diverging nozzle that includes a convergent section 26a, a throat section 26b, and a divergent section 26c.

The nozzle 26 is attached to the combustion chamber 24, and the combustion chamber 24 is attached to the injector assembly 22. For various reasons, such as, but not limited to, purposes of repair and/or replacement, it can be desirable to separate the injector assembly 22 and the combustion chamber 24 and then to reattach the injector assembly 22 (or a replacement injector assembly) and combustion chamber 24. As will be discussed in further detail below, the attachment between the injector assembly 22 and the combustion chamber 24 is adapted to facilitate such a separation and reattachment, while avoiding unduly influencing the properties and composition of the combustion chamber 24.

Generally speaking, a combustion chamber and injector assembly may be welded together. When the chamber and assembly are formed of similar materials, separating and then re-welding the assembly and the chamber back together may not cause a significant change to the properties and compositions of either the assembly or the chamber. However, when the chamber and the assembly are formed of dissimilar materials, once welded, the materials intermix at the weld joint. If the assembly and chamber are later separated at the weld joint, a region of intermixed composition can remain. Upon re-welding, this region of intermixed composition can influence the welding process and cause variation in the integrity of the new weld joint, thereby potentially introducing variation into the properties of the new weld joint. In particular, copper-based alloys that are attractive for use in combustion chambers can be prone to such intermixing if welded to a different alloy, such as a nickel-based alloy or stainless steel. In this regard, the engine 20 disclosed herein utilizes a non-copper weld transition ring 28 that facilitates separation and removal of the combustion chamber 24, which is formed of copper alloy, from the injector assembly 22, which can be formed of nickel-based alloy or stainless steel. Use of the ring 28 avoids intermixing of compositions that could otherwise alter the properties of the combustion chamber 24 and/or injector assembly 22.

Figure 2:
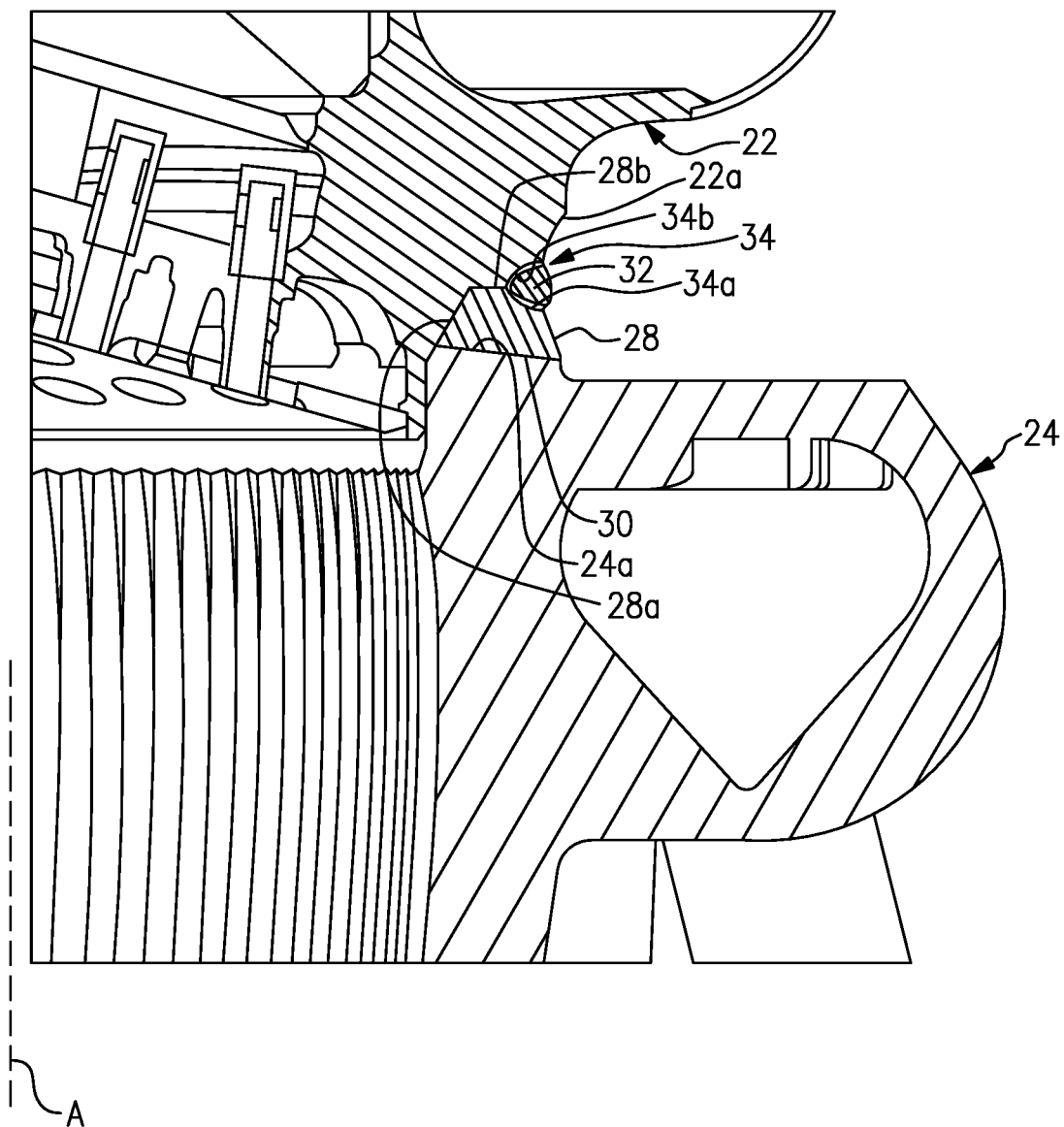
FIG. 2 illustrates a section view of a rocket engine that has a weld transition ring attached to a combustion chamber and an injector assembly.

FIG. 2 illustrates a magnified view of the attachment between the combustion chamber 24, which is formed of copper or copper alloy, and the injector assembly 22, which may be formed of stainless steel or nickel-based alloy. In such a case, if the stainless steel or nickel-based alloy of the injector assembly 22 were to be directly welded to the copper or copper alloy of the combustion chamber 24, the steel/nickel alloy would intermix with the copper. To alleviate such a situation, a non-copper weld transition ring 28 is interposed between the injector assembly 22 and the combustion chamber 24. More specifically, the ring 28 is welded along weld line 30 to the top of the combustion chamber 24, such as to axial endface 24a, and the injector assembly 22 is welded to the ring 28.

In the illustrated example, the weld line 30 is an electron beam weld joint that is formed by electron beam welding. In that regard, the joint 30 is a bimetallic weld joint that is comprised of the copper or copper alloy of the combustion chamber 24 and the material of the ring 28. That is, the joint 30 does not include any additional or separate weld filler that has been added to form the joint 30. As an example, the ring 28 is formed of a nickel-based alloy.

The injector assembly 22 is welded to the ring 28 using a weld bead 32. For example, the weld bead 32 is disposed in a cavity 34 that is defined, in part, by a first cavity wall portion 34a of the ring 28 and a second cavity wall portion 34b of the injector assembly 22, such as on the housing 22a. The cavity 34 is annular and extends entirely around the ring 28 and injector assembly 22. The weld bead 32 also provides a gas-tight seal between the injector assembly 22 and the ring 28. The weld bead 32 is a separate and distinct body that is provided in addition to the injector assembly 22 and the ring 28. For example, the weld bead 32 may be, but is not limited to, a nickel-based alloy or stainless steel. The nickel-based alloy or stainless steel of the weld bead 32 may be the same or different in composition as the nickel-based alloy or stainless steel of the injector assembly 22.

The ring 28 includes a frustoconical inner diameter surface 28a that bears against a mating surface of the injector assembly 22. In this example, the surface 28a flares outwardly to a substantially planar surface 28b that also bears against a mating surface of the injector assembly 22. Although a small amount of the weld bead 32 may melt and infiltrate into the interface along the surface 28b, the surfaces 28b/28a are substantially free and unbonded to the injector assembly 22. That is, the weld bead 32 substantially bonds the ring 28 and the injector assembly 22 via the walls 34a/34b. In this regard, to remove the injector assembly 22, the weld bead 32 can be cut (e.g., horizontally in FIG. 2) in order to liberate the injector assembly 22 from the ring 28 and combustion chamber 24. Although such a cutting process may also cut a small distance into the ring 28 and/or injector assembly 22, especially along the interface at the surface 28b, liberation of the injector assembly 22 from the combustion chamber 24 does not rely on cutting of either of these components, as it is the weld bead 32 that is responsible for the bonding. Thus, liberation only requires cutting of the weld bead 32.

Subsequently, the remnants of the weld bead 32 that may be present after such a cutting process may be removed or substantially removed from the injector assembly 22 and the ring 28. If the same injector assembly 22 is to be later reattached, the injector assembly 22 can be repositioned on the ring 28 such that the walls 34a/34b again form the cavity 34, and then a new weld bead 32 can be applied to again attach the injector assembly 22 to the ring 28. Alternatively, the same process can be applied to remove and replace the injector assembly 22 with a new injector assembly.

Figure 3:
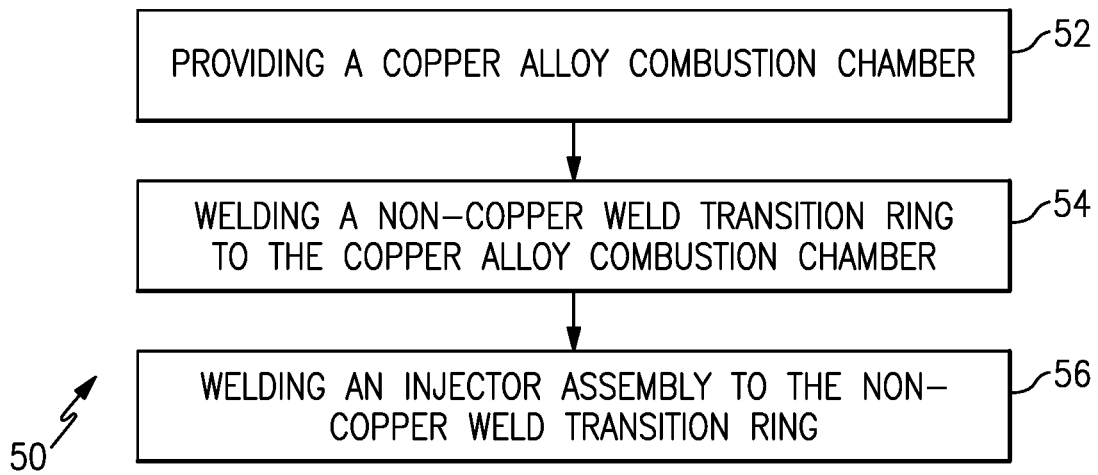
FIG. 3 illustrates an example of manufacturing a rocket engine.

FIG. 3 illustrates an example process 50 of manufacturing the rocket engine 20 as described herein. In this example, the process 50 includes a step 52 of providing the combustion chamber 24. For example, the combustion chamber 24 may be provided at 52 by furnishing the combustion chamber 24 as a pre-manufactured component. Alternatively, the providing of step 52 may include fabricating the combustion chamber 24 using additive manufacturing, which may also be referred to as 3-dimensional printing. An example additive manufacturing process may include, but is not limited to, selective laser sintering.

At step 54, the ring 28 is then welded to the combustion chamber 24. As described above, electron beam welding can be used to weld the ring 28 to the combustion chamber 24. Step 54 is followed by step 56 of welding the injector assembly 22 to the ring 28. As an example, this welding can involve the use of the weld bead 32 described above.

Figure 4:
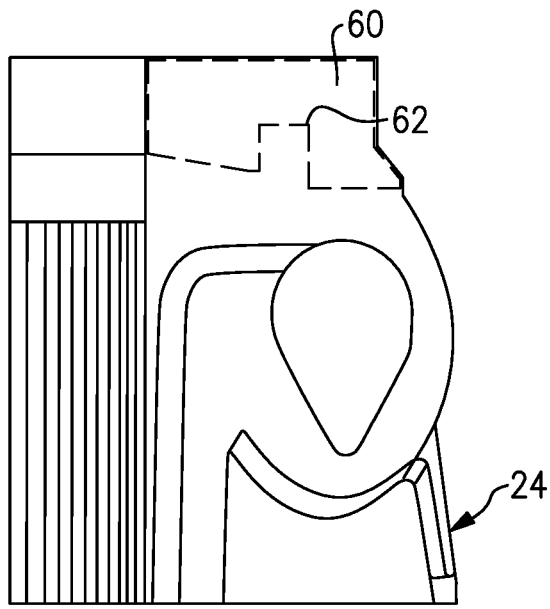
FIG. 4 illustrates the forming of a combustion chamber, including a sacrificial portion that is later removed.
Figure 5:
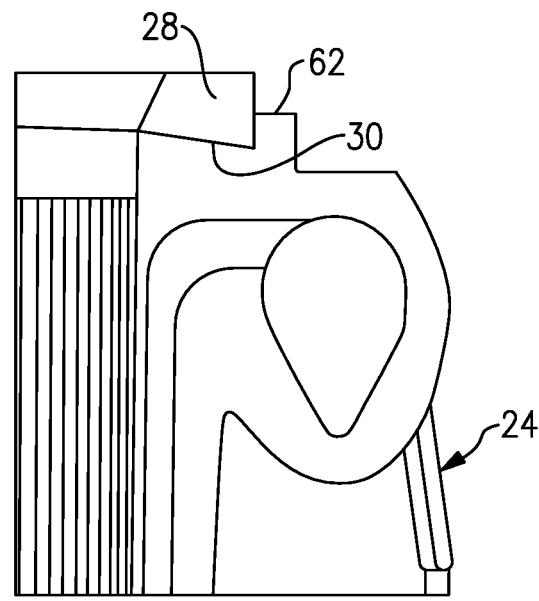
FIG. 5 illustrates welding of a weld transition ring to the combustion chamber.
Figure 6:
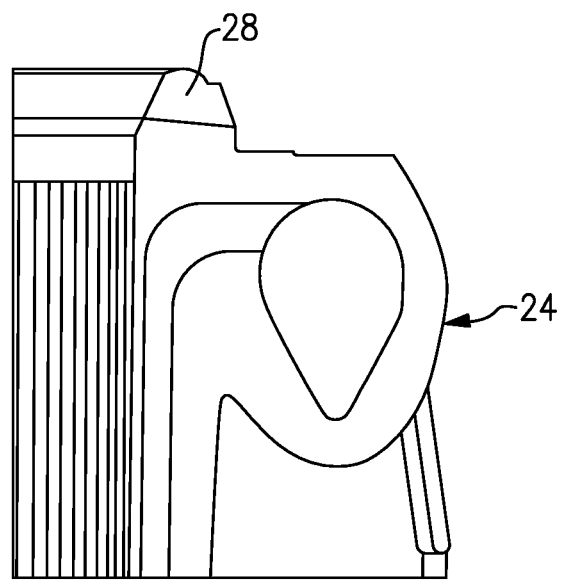
FIG. 6 illustrates the removal of a backstop from the combustion chamber.

FIGS. 4, 5, and 6 depict a further example of the process 50. For instance, FIG. 4 depicts the forming of the combustion chamber 24. In this example, the combustion chamber 24 is initially formed with a sacrificial section, denoted within the dashed region 60. This sacrificial section does not serve any functional purpose in the operation of the engine 20 or combustion chamber 24. Rather, after the forming, the sacrificial section 60 is removed, such as by a machining operation. The removal leaves a backstop 62 on the top of the combustion chamber 24. For instance, the backstop 62 is an annular ridge that extends circumferentially around the top of the combustion chamber 24.

FIG. 5 depicts an example of the welding of the transition ring 28 to the combustion chamber 24. Here, the ring 28 is positioned adjacent the backstop 62 prior to the welding operation. In this regard, the backstop 62 may facilitate proper location of the ring 28 relative to the combustion chamber 24. The backstop 62 also facilitates the electron beam welding along the joint 30 by providing excess material that reduces cavitation or warping along the joint 30. Once welded, as shown in FIG. 6, the backstop 62 and a portion of the ring 28 are removed from the combustion chamber 24. The backstop 62 is thus also sacrificial and serves no purpose in the operation of the engine 20 or combustion chamber 24. For instance, a machining operation can be used to cut or grind away the backstop 62 and a portion of the ring 28. The removal of the backstop 62 and a portion of the ring 28, particularly along the joint 30, removes the termination of the weld and any underfill, thereby providing a smooth and continuous joint 30. This subsequent machining operation is intended to remove any entrance and termination effects of the weld resulting in no discontinuities in the joint.

After removal of the backstop 62, the injector assembly 22 can then be welded to the ring 28. Alternatively, the injector assembly 22 can be welded to the ring 28 before removal of the backstop 62, although if the presence of the injector assembly 22 hinders the removal of the backstop 62, it may be advantageous to remove the backstop 62 prior to the welding of the injector assembly 22 to the ring 28.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A process of manufacturing a rocket engine, the process comprising:
    providing a copper alloy combustion chamber using additive manufacturing;
    welding a non-copper weld transition ring to the copper alloy combustion chamber; and
    welding an injector assembly to the non-copper weld transition ring.

2. The process as recited in claim 1, wherein the welding of the non-copper weld transition ring to the copper alloy combustion chamber is performed by electron beam welding.

3. The process as recited in claim 1, wherein the welding of the injector assembly to the non-copper weld transition ring includes using a weld bead.

4. The process as recited in claim 1, further comprising removing the injector assembly from the non-copper weld transition ring, followed by re-welding the injector assembly or a new injector assembly to the non-copper weld transition ring.

5. The process as recited in claim 4, wherein the composition of the copper alloy combustion chamber is unchanged through the removing and the re-welding.

6. The process as recited in claim 1, wherein the welding of the non-copper weld transition ring to the copper alloy combustion chamber includes welding the ring adjacent to a backstop on the copper alloy combustion chamber, followed by removing the backstop from the copper alloy combustion chamber.

7. The process as recited in claim 1, wherein the providing of the copper alloy combustion chamber includes forming the copper alloy combustion chamber by selective laser melting.

8. A rocket engine comprising:
    a copper alloy combustion chamber;
    a non-copper weld transition ring welded to the copper alloy combustion chamber; and
    an injector assembly welded to the non-copper weld transition ring.

9. The rocket engine as recited in claim 8, further comprising a converging-diverging nozzle attached to the copper alloy combustion chamber.

10. The rocket engine as recited in claim 8, wherein the non-copper weld transition ring is formed of stainless steel or a nickel-based alloy.

11. The rocket engine as recited in claim 8, wherein the injector assembly is formed of stainless steel or a nickel-based alloy.

12. The rocket engine as recited in claim 8, wherein the non-copper weld transition ring and the injector assembly are formed of stainless steel or a nickel-based alloy.

13. The rocket engine as recited in claim 12, wherein the non-copper weld transition ring and the injector assembly are joined together by a weld bead.

14. The rocket engine as recited in claim 8, wherein the non-copper weld transition ring and the copper alloy combustion chamber are joined by an electron beam weld joint.

15. The rocket engine as recited in claim 8, wherein the non-copper weld transition ring defines a first cavity wall portion and the injector assembly defines a second cavity wall portion, and the first cavity wall portion and the second cavity wall portion together define a cavity, and there being a weld bead disposed in the cavity.

16. The rocket engine as recited in claim 8, wherein the non-copper weld transition ring includes a frustoconical inner diameter surface that bears against the injector assembly.

* * * * *